United States Patent [19]
Ulenas

[11] Patent Number: 5,305,449
[45] Date of Patent: Apr. 19, 1994

[54] KEYCODE/POINTING DEVICE CONVERSION ADAPTER WHICH CONVERTS MOUSE MOTION SIGNALS INTO CURSOR SIGNALS BY ACTIVATING KEYBOARD CURSOR KEYS

[75] Inventor: Jonas Ulenas, Dix Hills, N.Y.

[73] Assignee: Vetra Systems Corporation, Plainview, N.Y.

[21] Appl. No.: 614,640

[22] Filed: Nov. 16, 1990

[51] Int. Cl.$^5$ .............................................. G06F 3/033
[52] U.S. Cl. .............................. 395/500; 364/927.92; 364/927.99; 364/928; 364/929.12; 364/DIG. 2; 395/275; 345/160; 345/168; 345/163
[58] Field of Search .............. 395/275, 500; 340/711, 340/710

[56] References Cited

U.S. PATENT DOCUMENTS

| | | | |
|---|---|---|---|
| 4,689,761 | 8/1987 | Yurchenco | 364/708 |
| 4,774,689 | 9/1988 | Morisawa | 395/275 |
| 4,886,941 | 12/1989 | Davis | 178/18 |
| 4,959,860 | 9/1990 | Watters | 380/4 |
| 5,097,506 | 3/1992 | Kaiser | 380/25 |
| 5,119,479 | 6/1992 | Arai | 395/275 |

Primary Examiner—Eric Coleman
Attorney, Agent, or Firm—Jones, Day, Reavis & Pogue

[57] ABSTRACT

An adapter electronics circuit that converts signals from a pointing device into codes corresponding to keyboard cursor key actuations. In addition to the pointing device signals, the adapter electronics also accepts all key codes generated by the keyboard and passes them on unmodified to the computer. The adapter electronics plugs into the same terminal on the computer where the keyboard is normally connected. In this manner, all normal keyboard functions are available to the user as well as the use of the pointing device through the normal keyboard terminal on the microprocessor. Most commercially available application software accepts the cursor key codes presented to the computer.

6 Claims, 2 Drawing Sheets

KEYCODE/POINTING DEVICE CONVERSION ADAPTER WHICH CONVERTS MOUSE MOTION SIGNALS INTO CURSOR SIGNALS BY ACTIVATING KEYBOARD CURSOR KEYS

FIELD OF THE INVENTION

The present invention relates in general to computer systems having a display device with a movable cursor and in particular to adapter electronics coupled to a computer for moving the display cursor with pointing device signals and keyboard generated cursor key code signals through a common port in the computer.

BACKGROUND OF THE INVENTION

Computers, including personal computers, have a wide application of uses and are increasingly in demand. Most of these computers have associated with them a display device and a keyboard input device. Further, pointing devices may be used with these computers. Such conventional pointing devices include devices known as a mouse, a track ball, a digitizing tablet, a light pen, a touch screen and the like. These pointing devices require the use of either a printed circuit board (hardware) that plugs into the internal bus of the computer (bus mouse) or the use of a serial, RS-232, port of the computer (serial mouse) making the serial port unavailable for other uses such as modems and the like. In other cases, the pointing devices require a software driver, always resident in the computer, to bridge the output from the bus electronics, in the case of a bus mouse, or from the serial port, in case of the serial mouse, to the application software. Special arrangements must be made in the application software to accept inputs from pointing devices. For this reason, not all application software allows the use of a pointing device.

The present invention overcomes the disadvantages of the prior art by providing adapter electronics coupled between the computer and the pointing device and the keyboard. While the invention can be applied to any computer system that has a display and keyboard input device with cursor keys (such as video terminals attached to mini and main frame computers), it will be discussed herein in relation to personal computers. The pointing device and the keyboard plug into the adapter electronics which, in turn, plugs into the personal computer through the normal keyboard port. Thus, no internal electronics is required, as is the case with a bus mouse, and the serial port is not used, as in the case with a serial mouse. No software driver is required, thereby avoiding the conflicts that sometime arise when additional resident software functions are loaded into the personal computer. Further, no special arrangements are necessary in the application software. If the application software accepts or reacts to cursor keys, as most commercially available software does, it can also use pointing devices with the present invention. No external power supply is required since the power is supplied by the personal computer.

The adapter electronics converts signals from the pointing device into codes corresponding to keyboard key actuations. In this manner, the user may perform all functions of the application software that can be done with keyboard cursor keys except with much greater convenience and speed. In addition to signals from the pointing device, the adapter electronics accepts key codes generated by the keyboard and passes them on unmodified to the personal computer. In this manner, all normal keyboard functions are available to the user. Most commercially available application software accepts cursor key codes generated by the keyboard.

There are two major types of pointing devices commercially available. The first type generates two pulse trains for each vertical and each horizontal motion. In accordance with standard practice, the phasing of the two pulse trains indicates direction of motion. These pulse trains are generated in response to motion of the pointing device. This type of pointing device is conventionally called a "bus mouse" since an electronics card, plugged into the bus of the personal computer, is necessary to accept the pointing device signals.

The second type of pointing device generates ASCII codes in serial, ASCII coded format using the RS-232 protocol. These codes are transmitted by the pointing device and indicate the distance moved in vertical and horizontal directions. The present invention is not dependent on the type of signals generated by the pointing device. Any type of signal generated by a pointing device can be converted into cursor key codes. The present invention converts the pointing device signals into cursor key codes corresponding to those generated by the keyboard.

Many conventional pointing devices have one or more switches which the user can activate to cause reactions in the software. The present invention can accept any number of switch closures, in addition to the pointing device signals, and generate codes to the personal computer as if certain keys or key combinations were pressed on the main keyboard itself. The same circuit that merges the key codes generated from the pointing device signals into the personal computer's keyboard input terminal is used to merge the key codes generated from switch closures on the pointing device.

Thus, the present invention relates to adapter electronics that converts pointing device signals into cursor key code signals corresponding to cursor key code signals generated by keyboard cursor key actuations and couples them selectively to a common terminal in the personal computer. It is, therefore, a major object of the present invention to provide adapter electronics for a personal computer system which allows a pointing device and a keyboard to be coupled to the personal computer through a common port.

SUMMARY OF THE INVENTION

The present invention relates to a computer system having a display device with a cursor movable with cursor key code signals and comprising an electronic signal input terminal on the computer for receiving the cursor key code signals, a keyboard having cursor keys thereon for generating cursor key code signals when actuated, a pointing device for generating signals representing motion of the pointing device in orthogonal planes, adapter electronics coupled to the keyboard for receiving the cursor key code signals and to the pointing device for converting the pointing device motion signals into cursor code signals corresponding to the cursor key code signals generated by the keyboard cursor key actuations, and means for alternatively coupling the converted pointing device cursor code signals and the keyboard cursor key code signals to the computer electronic signal input terminal as inputs to the computer.

The invention also relates to a method for moving the cursor on a computer display with pointing device signals and keyboard generated cursor key code signals, the method comprising the steps of generating cursor key code signals with cursor keys on a keyboard, receiving the keyboard cursor key code signals at an electronic signal input terminal on the computer, generating signals representing motion of a pointing device in orthogonal planes, converting the pointing device motion signals into cursor code signals corresponding to the cursor key code signals generated by the keyboard cursor key actuations, and alternatively coupling the converted pointing device cursor code signals and keyboard cursor key code signals to said computer input terminal for controlling movement of the display cursor.

BRIEF DESCRIPTION OF THE DRAWINGS

These and other objects of the present invention will be more fully understood in conjunction with the accompanying drawings in which like numbers indicate like components and in which.

DETAILED DESCRIPTION

Figure 1:
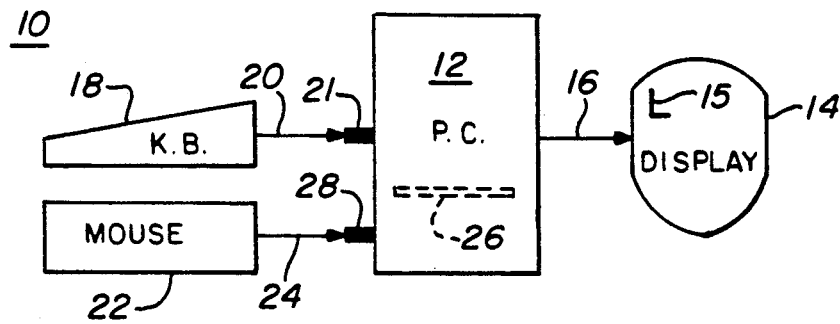
FIG. 1 is a block diagram of the prior art apparatus for coupling a keyboard and a mouse to a computer such as a personal computer.

The prior art personal computer system 10 shown in FIG. 1 includes a computer 12 such as a personal computer coupled to a display 14 through connector 16. The display 14 has a cursor 15 thereon which can be moved by a keyboard 18 coupled to the computer 12 through line 20 and conventional keyboard terminal 21. A pointing device 22 may be coupled to the computer 12 through line 24 and terminal 28. The pointing device 22 may be any conventional type such as a mouse, track ball, digitizing tablet, light pen, touch screen or the like. By operating certain keys on keyboard 18 or by controlling the pointing device 22, the cursor 15 on the display 14 can be caused to move to any point on display 14 that the operator desires.

A conventional pointing device requires either a printed circuit board 26 (hardware) that plugs into the internal bus of the computer 12 ("bus mouse"), or must make use of a serial, RS-232, port or terminal 28 of the computer 12 ("serial mouse"). Such use makes the serial port 28 unavailable for any other uses such as modems and the like. The conventional pointing device also requires a software driver, always resident in the computer 12, to bridge the output from the bus electronics, in the case of the bus mouse, or from the serial port, in case of the serial mouse, to the application software and requires special arrangements in the application software to accept the pointing device input. For this reason, not all application software allows the use of a pointing device.

Figure 2:
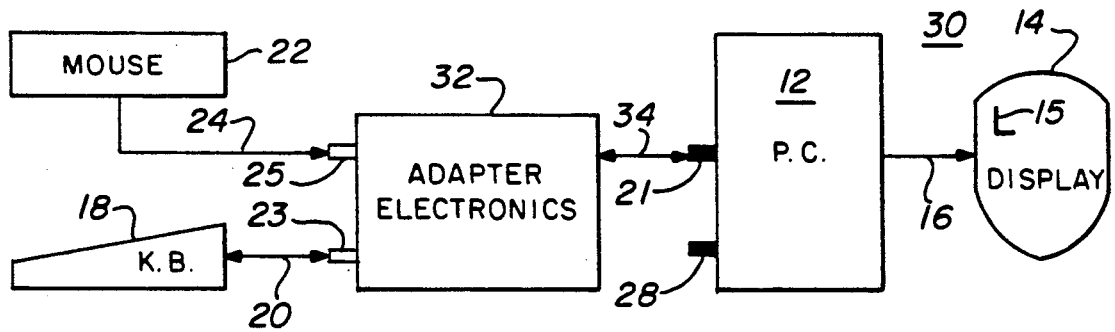
FIG. 2 is a basic block diagram of the present invention using adapter electronics to couple a pointing device and a keyboard to a computer through the conventional keyboard input terminal.

The novel invention disclosed herein overcomes the disadvantages of the prior art and is illustrated in FIG. 2. The system 30 again includes a computer 12 coupled to a display device 14 through line 16. It also has a keyboard 18 and a pointing device 22 as part of the system. However, both the keyboard 18 and the pointing device 22 are coupled to terminals 23 and 25, respectively, of an adapter electronics circuit 32 through lines 20 and 24, respectively. The output of the adapter electronics 32 on line 34 is coupled to the conventional keyboard port 21 on the computer 12, thus leaving the port 28 free for modems and the like. The adapter electronics 32 plugs in the same connector 21 on the computer 12 where the keyboard 18 is normally attached. The keyboard 18 is attached by a flexible cable 20 to the adapter electronics 32. The system is powered from the computer 12 keyboard plug 21, the same as the keyboard. No external power supply is required.

The adapter electronics 32 converts signals from the pointing device 22 into codes corresponding to keyboard cursor key actuations. In the same manner, the user may perform all functions with the application software that can be done with cursor keys on the keyboard except with much greater convenience and speed. In addition to the signals from the pointing device 22, the adapter electronics 32 accepts all key codes generated by the keyboard 18 and passes them on unmodified to the computer 12. In this manner, all normal keyboard functions are available to the user. Most application software accepts keyboard generated cursor key codes.

Figure 3:
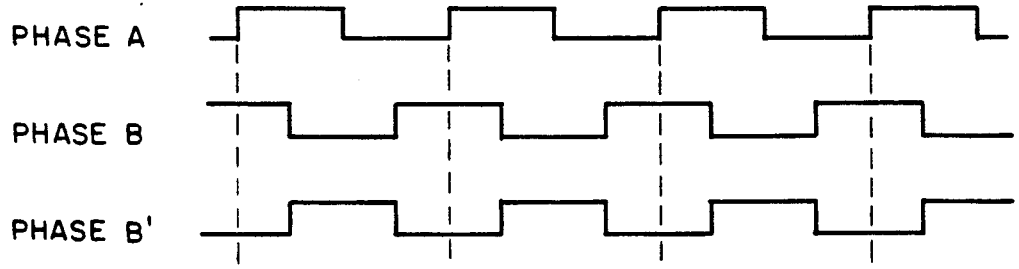
FIG. 3 is a wave form diagram illustrating the phase relationship of the signals generated by the pointing device in one version thereof.

There are two major types of pointing devices 22 commercially available. The first type generates two pulse trains for each vertical and each horizontal motion as shown in FIG. 3. In accordance with standard practice, the signal level transition represents motion and the phasing of the two pulse trains indicates direction of motion. The pulse trains are generated in response to motion of the pointing device. This type of pointing device is conventionally called a "bus mouse" since an electronics card 26, plugged into the bus of the PC as shown in FIG. 1, is normally necessary to accept the pointing device signals. As indicated in FIG. 3, for example, the wave form designated Phase A represents one of the pulse trains generated for both vertical and horizontal motion. The wave form labeled Phase B is shifted in phase with respect to Phase A and indicates one direction of movement of the pointing device. The wave form designated Phase B' is of opposite phase from Phase B and indicates movement of the pointer in the opposite direction.

The second type of pointing device 22 generates ASCII codes in serial, ASCII coded format using the RS-232 protocol as is well known in the art. These codes are transmitted by the pointing device and indicate the distance moved in vertical and horizontal directions.

As stated previously, the present invention is not dependent on the type of signals generated by the pointing device. Any type of signal generated by a pointing device can be converted into signals corresponding to keyboard generated cursor key codes. It is the conversion of the pointing device signals into corresponding cursor key code signals that is the major principle of the present invention.

Figure 4:
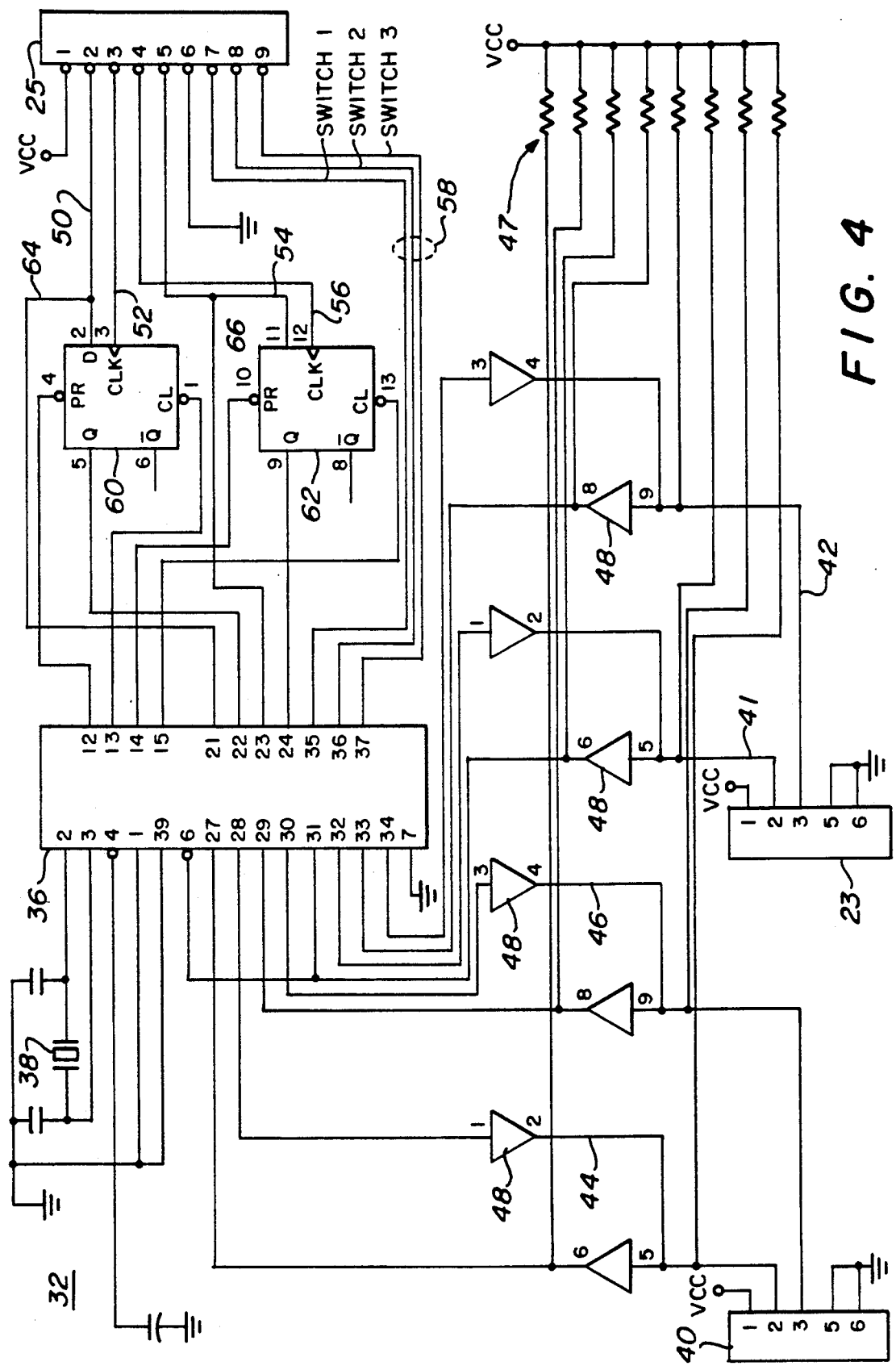
FIG. 4 is a detailed circuit diagram of the adapter electronics of the present invention that connects the keyboard and the pointing device to the computer through the conventional keyboard input terminal.

FIG. 4 illustrates the circuit details of the novel adapter electronics 32. The heart of the circuit is a microprocessor 36 designated as the 8749 which is a single chip eight-bit microcomputer with an E-prom and which operates at 11 MHz. One such type is manufactured by Intel Corporation and is commercially available. Any microprocessor with similar capabilities can be used. In FIG. 4, the keyboard 18 has its cable 20 coupled to terminal 23. The pointing device 22 is coupled on cable 24 to terminal 25. Terminal 40 is coupled to the conventional keyboard input terminal 21 of the computer 12. Signals to and from keyboard terminal 23 on lines 41 and 42 are coupled to and from the microprocessor 36. All of the key code signals from the keyboard on lines 41 and 42 pass through the microprocessor 36 to terminal 40 on lines 44 and 46 to be used by the computer 12. These are the keyboard generated key code signals and include cursor key code signals. The input signals on line 41 are the clock signals and the input lines on 42 from the keyboard are the data signals. The output signals on line 44 from the microprocessor 36 are the clock signals to the computer 12 and the signals on line 46 are the data signals to the computer 12. In each of these lines 41, 42, 44 and 46 is a buffer/driver circuit 48. Pull-up resistors 47 are coupled as shown to the buffer/driver 48 for proper operation thereof.

The signals from pointing device 22 on terminal 25 include the Phase A and Phase B signals on lines 50 and 52 to designate vertical movement of the pointing device and the Phase A and Phase B signals on lines 54 and 56 to designate the horizontal movement of the pointing device. Further, many conventional pointing devices 22 have one or more switches which the user can activate to cause reactions in the software. The present adapter electronics 32 can accept any number of switch closures, three lines of which are illustrated in FIG. 4 by the numeral 58, in addition to the pointing device signals, and the microprocessor 36 generates key codes into the computer 12 as if certain keys were pressed on the main keyboard 18. The same principles that merge the cursor codes generated from the pointing device signals into the computer keyboard input terminal are used to merge the key codes generated from switch closures on the pointing device.

As indicated earlier, the pointing device 22 generates signals identified as vertical Phase A on line 50, vertical Phase B on line 52, horizontal Phase A on line 54, and horizontal Phase B on line 56. The phase relationship of these signals was discussed in relation to FIG. 3. These signals are used to set and/or reset two flip-flops 60 and 62. One of each of the horizontal and vertical signals is also brought into the microcomputer 36 on lines 64 and 66. The firmware of the microprocessor 36 detects a high-to-low (or low-to-high) signal level transition on either of the two lines 64 and 66 and samples the state of the associated flip-flop 60 or 62. The state of the flip-flop at this time indicates direction and the signal level transition indicates motion. From this information, the firmware in microprocessor 36 generates appropriate signals on the clock and data lines 44 and 46, respectively, to the computer 12 through terminal 40. The standard IBM personal computer keyboard protocol is observed. However, any other appropriate protocol could be used.

Simultaneously, the firmware of the microcomputer 36 monitors the clock line 41 from the keyboard 18 to detect incoming key strokes. The key strokes are accepted by the firmware and then transmitted to the computer 12 through terminal 40.

Arbitration between the pointing device input 25 and the keyboard input 23 is done by using the computer protocol set forth above to inhibit keyboard transmission when the cursor key strokes generated from motion of the pointing device 22 are being actually transmitted. In accordance with the IBM protocol, when the keyboard is inhibited, it must store any key strokes, and transmit them when the inhibit is removed, so no key strokes are lost. The time to transmit the make/break codes for the simulated cursor key is approximately two milliseconds. The keyboard is then enabled. Effectively, there is no impact on the operation of the keyboard.

The two flip-flops 60 and 62 are actually not necessary for the type of microprocessor shown, the 8749. It is fast enough to react to the signal level transition of conventional pointing devices. The flip-flops 60 and 62 are shown in FIG. 4 for general purposes to indicate an approach when the microcomputer might not be sufficiently fast.

Figure 5:
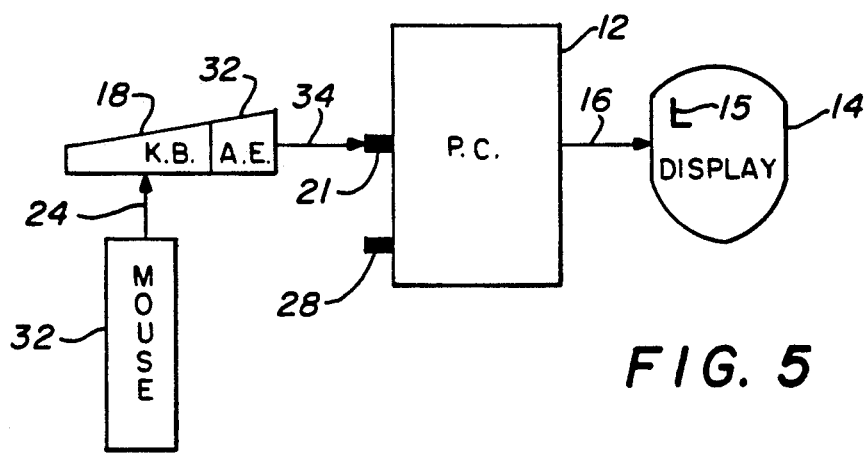
FIG. 5 is a block diagram of an alternate version of the present invention in which the adapter electronics is incorporated in the keyboard.

FIG. 5 discloses an alternate version of the inventive device in which the adapter electronics 32, which converts signals from the pointing device 22 to cursor key codes, is incorporated into the electronics of the conventional keyboard 18. The conventional keyboard encoder electronics converts switch closures to key codes and transmits them to the host computer. In addition to accepting switch closures, the keyboard encoder electronics can be extended to accept also the pointing device signals and convert them to corresponding cursor key codes with the adapter electronics 32 incorporated therein in addition to generating cursor key codes in response to actuations of the keyboard cursor keys proper.

Thus, with the novel device disclosed herein, the system avoids the prior art disadvantages since no internal electronics are required (bus mouse) and the serial port is not occupied (serial mouse) so as to prevent the serial port from being used by a modem or other device. No software driver is required thereby avoiding the conflicts that sometimes arise when additional resident software functions are loaded into the computer. Finally, no special arrangements are necessary in the application software. If the application software accepts or reacts to cursor keys, as most commercially available software does, it can be used with the present system. As stated earlier, while the invention has been described in relation to a personal computer, it can be used with any computer system that has a display and a keyboard input device with cursor keys such as video terminals attached to mini and main frame computers. Many of such systems do not support a pointing device of any type yet have cursor keys as part of the keyboard. Also, the microprocessor is not limited to the Intel 8749, but can be used with any microprocessor having similar capabilities.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A computer system having a display device with a cursor separately movable with either keyboard or pointing device key code signals, the system comprising:

an electronic signal input terminal on the computer for normally receiving only keyboard cursor key code signals that move the cursor;

a keyboard having keys thereon including cursor keys for generating key code signals when actuated;

a pointing device for generating signals representing motion of the pointing device in orthogonal planes;

adapter electronics coupled to the keyboard for receiving the keyboard key code signals and to the pointing device for converting only the pointing device signals into cursor code signals corresponding to the cursor key code signals generated by activating cursor keys on the keyboard; and means in the adapter electronics for alternatively coupling the converted pointing device cursor code signals and the keyboard key code signals to the computer electronic signal input terminal such that movement of the cursor on the display may be controlled from either the keyboard or the pointing device through the computer electronic signal input terminal.

2. A system as in claim 1 wherein the adapter electronics includes a microcomputer.

3. A system as in claim 2 wherein the alternative coupling means comprises means in the microcomputer for inhibiting keyboard cursor key code signal transmission when the converted cursor code signals from the pointing device are being actually received by the microprocessor.

4. A system as in claim 3 wherein the signals generated by the pointing device comprise:

first and second pulse trains having a phase separation representing pointing device motion in one plane;

third and fourth pulse trains having a phase separation for representing pointing device motion in a plane orthogonal to the one plane; and the microcomputer converting the first, second, third and fourth pulse trains into the cursor code signals corresponding to the keyboard generated cursor key code signals.

5. A system as in claim 4 further comprising:

a first flip-flop for being set and reset by one of the first and second pulse trains to indicate direction of movement of the pointing device in one orthogonal plane;

a second flip-flop for being set and reset by one of the third and fourth pulse trains to indicate direction of movement of the pointing device in a second orthogonal plane; and the microcomputer coupled to the first and second flip-flops and directly receiving one of the first and second pulse trains and one of the third and fourth pulse trains, the microcomputer detecting a pulse level transition on either of the directly received pulse trains to determine motion of the pointing device in the orthogonal planes and sampling the state of the associated flip-flop to determine direction of movement of the pointing device in the orthogonal planes.

6. A system as in claim 3 wherein the signals generated by the pointing device comprise:

ASCII codes serial generated in ASCII coded format to indicate the distance moved in the orthogonal planes; and the microcomputer converting the ASCII codes into cursor code signals corresponding to the keyboard generated cursor key code signals.

* * * * *

UNITED STATES PATENT AND TRADEMARK OFFICE
CERTIFICATE OF CORRECTION

PATENT NO. : 5,305,449

DATED : April 19, 1994

INVENTOR(S) : Jonas Ulenas

It is certified that error appears in the above-identified patent and that said Letters Patent is hereby corrected as shown below:

```
Column 8, line 29, delete "serial" and insert in
place thereof --serially--.
```

Signed and Sealed this

Thirteenth Day of September, 1994

Attest:

BRUCE LEHMAN

Attesting Officer

Commissioner of Patents and Trademarks